United States Patent
Shi et al.

(10) Patent No.: US 9,449,257 B2
(45) Date of Patent: Sep. 20, 2016

(54) DYNAMICALLY RECONSTRUCTABLE MULTISTAGE PARALLEL SINGLE INSTRUCTION MULTIPLE DATA ARRAY PROCESSING SYSTEM

(71) Applicant: INSTITUTE OF SEMICONDUCTORS, CHINESE ACADEMY OF SCIENCES, Beijing (CN)

(72) Inventors: Cong Shi, Beijing (CN); Nanjian Wu, Beijing (CN); Xitian Long, Beijing (CN); Jie Yang, Beijing (CN); Qi Qin, Beijing (CN)

(73) Assignee: Institute of Semiconductors, Chinese Academy of Sciences, Beijing (CN)

( * ) Notice: Subject to any disclaimer, the term of this patent is extended or adjusted under 35 U.S.C. 154(b) by 0 days.

(21) Appl. No.: 14/649,859

(22) PCT Filed: Dec. 4, 2012

(86) PCT No.: PCT/CN2012/085814
§ 371 (c)(1),
(2) Date: Jun. 4, 2015

(87) PCT Pub. No.: WO2014/085975
PCT Pub. Date: Jun. 12, 2014

(65) Prior Publication Data
US 2015/0310311 A1    Oct. 29, 2015

(51) Int. Cl.
G06K 9/62 (2006.01)
G06F 15/80 (2006.01)
G06T 1/20 (2006.01)
G06N 3/04 (2006.01)
G06N 3/063 (2006.01)

(52) U.S. Cl.
CPC ......... *G06K 9/6251* (2013.01); *G06F 15/8023* (2013.01); *G06N 3/0454* (2013.01); *G06N 3/063* (2013.01); *G06T 1/20* (2013.01)

(58) Field of Classification Search
CPC .. G06K 9/6251; G06N 3/0454; G06N 3/063; G06F 15/8023

USPC .......................................................... 382/158
See application file for complete search history.

(56) References Cited

U.S. PATENT DOCUMENTS 7,369,162 B2 * 5/2008 Yagi ..................... H04N 5/335
                                                      348/222.1
2006/0228027 A1 * 10/2006 Matsugu ........... G06K 9/00281
                                                        382/181

FOREIGN PATENT DOCUMENTS

| CN | 102131059 A | 7/2011 |
| CN | 102665049 A | 9/2012 |
| JP | 2000333083 A | 11/2000 |
| KR | 20090086660 A | 8/2009 |

* cited by examiner

*Primary Examiner* — Ruiping Li
(74) *Attorney, Agent, or Firm* — Seed IP Law Group PLLC

(57) ABSTRACT

The present invention proposes a dynamically reconfigurable multi-level parallel single instruction multiple data array processing system which has a pixel level parallel image processing element array and a row-parallel array processor. The PE array mainly implements a linear operation which is adapted to be executed in parallel in the low and middle levels of image processing and the RP array implements an operation which is adapted to execute in row-parallel in the low and middle levels of image processing or more complex nonlinear operations. In particularly, such a system can be dynamically reconfigured as an SOM neural network at a low cost of area, and the neural network supports high level of image processing such as a high speed online neural network training and image feature recognition, and completely overcomes a defect that a high level of image processing can't be done by pixel-level parallel processing array in the existing programmable vision chips and parallel vision processors, and facilitates an intelligent and portable real time on-chip vision image system with a complete function at low device cost and low power consumption.

24 Claims, 8 Drawing Sheets

DYNAMICALLY RECONSTRUCTABLE MULTISTAGE PARALLEL SINGLE INSTRUCTION MULTIPLE DATA ARRAY PROCESSING SYSTEM

TECHNICAL FIELD

The present disclosure relates to the technical field of vision image processing, such as programmable vision chip, parallel vision image processor, artificial neural network and so on, in particularly, to a dynamically reconfigurable multi-level parallel single instruction multiple data array processing system which can be used for fast image feature extraction, as well as dynamically reconfigured as a self organizing map neural network for fast image feature recognition.

DESCRIPTION OF THE RELATED ART

A conventional vision image processing system comprises separated camera and general processor (or a digital signal processor (DSP)). The camera uses an image sensor to capture images and the images are processed by utilizing software in the general processor or DSP. Since the images are serially processed by utilizing software in the general processor or DSP pixel by pixel, there is a bottleneck in the serial processing. Thus, the conventional vision image system generally implements a speed of about 30 frames per second, which can't meet the real-time requirement of a high speed. For example, some industrial control system usually requires a speed of about 1000 frames per second.

The proposal of the vision chip and the parallel vision processor effectively meet the real-time requirement for the high speed. The vision chip is a novel on-chip vision system where the image sensor and the image processing circuit are integrated on a single chip. In the programmable vision chip including a high speed parallel vision processor, the image processing circuit usually employs a pixel-level parallel image processing architecture, which is a array of processing elements constituted of identical processing elements and is operated in a single instruction multiple data mode, so that the processing speed for low- and middle-level of image processing are greatly improved to implement a feature extraction speed of vision images over 1000 frames per second.

However, there are serious deficiency for the single pixel-level parallel processing architecture as follows:

1) the pixel-level image parallel processing elements in the pixel-level image parallel processing architecture are arranged in a array and may implement fast local processing for all of the pixels; but such units can't implement rapid and flexible global processing;

2) such a pixel-level parallel image processing architecture supports processing of low- and middle-level image processing so as to implement a feature extraction speed over 1000 frames per second. But it lacks a function of high-level image processing, especially lacking a simple and intuitive ability of rapid feature recognition similar to cortical nerves of human beings. Thus, it has to constitute a vision image system with the aid of an external general processor, which introduces a serial processing bottleneck again and cancels out the high speed low- and middle-level processing ability obtained by the pixel-level parallel processing architecture. Thus, the whole vision image processing (including image feature extraction and image feature recognition) still can't meet the real-time requirement at a high speed of about 1000 frames per second.

SUMMARY

1) Technical Problem to be Solved

For the technical problem in the existing pixel-level parallel image processing architecture, the present invention provides a dynamically reconfigurable multi-level parallel single instruction multiple data (SIMD) array processing system which can be used for fast image feature extraction, as well as dynamically reconfigured as a self organizing map (SOM) neural network for fast image feature recognition.

2) Solutions to the Problem

In order to achieve the aim as mentioned above, the present invention provides a dynamically reconfigurable multi-level parallel single instruction multiple data array processing system, which is applied for rapid image feature extraction and feature recognition of a vision image on a high speed on-chip vision system. The system comprises: a configurable image sensor interface 1 used to receive pixel data from an image sensor serially or in parallel, and to output the pixel data in row-parallel to a subsequent dynamically reconfigurable parallel image processing element array and self organizing map (SOM) neural network 2; the dynamically reconfigurable parallel image processing element array and self organizing map (SOM) neural network 2 with the ability to be dynamically reconfigured to be an M×M pixel-level parallel processing element (PE) array or an (M/4)×(M/4) self organizing map (SOM) neural network so as to implement image feature extraction and image feature recognition during the respective stages of the image processing, wherein M is a natural number; a row processor (RP) array 5 used to assist the dynamically reconfigurable parallel image processing element array and self organizing map (SOM) neural network 2 to implement relative image processing tasks during the respective stages of image processing, to implement a rapid nonlinear processing and a global processing, and to serially shift in data and output processing results under external control of the system; and an array controller 8 used to, under control of a driver external to the system, read control instructions for controlling the dynamically reconfigurable parallel image processing element array and self organizing map (SOM) neural network 2 and the RP array 5 from a variable very long instruction word single instruction multiple data VVS instruction memory internal to the system, and used to decode the control instructions along with some values of their own specific registers to be output to the dynamically reconfigurable parallel image processing element array and self organizing map (SOM) neural network y 2 and the RP array 5 as an array control signal.

In the above technical solution, the reconfigurable parallel image processing element array and self organizing map (SOM) neural network 2 comprises M×M of fine-grained parallel image processing element PE3 which operates in a single instruction multiple data SIMD mode in a pixel-level parallel fashion. Every block of 4×4 PE sub-array 4 in the reconfigurable parallel image processing element array and self organizing map (SOM) neural network 2 may be dynamically reconfigured to be one SOM neuron in the SOM neural network. Before the 4×4 PE sub-array 4 is reconfigured into an SOM neuron, every PE unit 11 is connected to its four nearest PE units and communicates data with them in a bandwidth of 1 bit. The PE unit on boundaries of the 4×4 PE sub-array 4 is connected to the PE unit of the adjacent 4×4 PE sub-array 4 and communicates data with them.

In the above technical solution, every PE unit comprises a one bit arithmetic logic unit ALU13, one carry register Creg12 and a local memory 14 with a bit width of 1 bit and a bit depth of W, wherein W is a natural number. Operands of the arithmetic logic unit 13 are from memories in its own PE unit or the adjacent PE units. The carry-out generated during the operation are stored into the carry register in the PE unit and functions as an carry-in of the arithmetic logic unit for the next operation, so as to implement a multiple bit operation in such a bit-serial fashion.

In the above technical solution, the 4×4 PE sub-array 4 is reconfigured to be one SOM neuron 15 in the SOM neural network, in which topological connections of the PE units changes, and each PE unit acts as one "bit-slice" of the reconfigured SOM neuron. In other words, every PE unit contributes its computing sources and memory sources to corresponding bit in the SOM neuron where the concerned PE unit is located. So it is mapped to be some bit in the SOM neuron. At this moment, the PE unit can only be connected to two PE units which are mapped to the adjacent bits and communicated data with them, and the band width is increased to be two bit including one bit of memory data communication and one bit of carry data communication.

In the above technical solution, every carry-out of the PE unit functioning as one "bit slice" is not stored into its own carry register, but directly functions as a carry-in of the arithmetic logic unit in the adjacent "bit slice" PE at higher bit position in the reconfigured SOM. Thus, the arithmetic logic units in all of the 4×4 PE units are connected together to form one 16-bit arithmetic logic unit. The final carry-out of such a 16-bit arithmetic logic unit is saved into a sign indicator register 17 of the SOM neuron and functions as a carry-in or a conditional operation indicator for the subsequent operations. Every SOM neuron is formed by reconfiguring 16 PE units, so that one SOM neuron can process a 16-bit data corresponding to a bit width of 16 bits, and every PE unit has a bit width of 1 bit. Thereby, one SOM neuron corresponds to 16 PE units which are logically arranged in order and each of the PE unit corresponds to a specific "1 bit" in the SOM neuron.

In the above technical solution, the 16-bit operands of the 16-bit arithmetic logic unit are simultaneously coming from the memories of all the 4×4 PE units 16. So the SOM neuron 15 corresponds to a local memory 20 with a bit width of 16 and a bit depth of W, and the data communication function of the memory of the PE unit 16 is equivalent to the data shift function of the SOM neuron 15. The SOM neuron 15 obtained by reconfiguring the 4×4 PE sub-array 4 is capable of communicating data with its left and right neighboring SOM neurons in a communication bandwidth of 1-bit. The equivalent view of the SOM neuron 15 comprises one 16-bits ALU 18, one shift control unit 19, a local memory 20 with a bit width of 16-bits and a bit depth of W, and a 16-bit temporal register as well as some additional flag registers, such as Sflag register and so on.

In the above technical solution, the particular circuit arrangement of the PE unit comprises one 1-bit ALU unit 23, a first operand selector 26, a second operand selector 25, a local dual-port memory 28 with a bit width of 1-bit and a bit depth of W, one condition selector 29, one carry register 22, one temporary register 24 and some multiplexers relevant to operand selection and dynamical reconfiguration. The two inputs of these multiplexers relevant to reconfiguration are marked as PE and SOM which represent to implement a data selection function relevant to reconfiguration.

In the above technical solution, in order to reconfigure into a self organizing map neural network, the PE units in each 4×4 PE sub-array 4 further share one additional flag register file 31, and such a flag register file 31 is constituted of four 1-bit flag registers which are reconfiguration flag register Rflag32, winning flag register Wflag 33, sign flag register Sflag 34 and overflow flag register OVflag 35. The flags of the flag register file 31 are output to the PE units for some data selection control and their values can be updated by outputs of some PE units and/or external control signals from the array instructions.

In the above technical solution, the reconfigurable flag register Rflag 32 implements the dynamical reconfiguration by controlling the reconfiguration multiplexers to change topological connections among the PE units. When the Rflag is set to 0, the respective reconfiguration multiplexers select input data at the "PE" terminal, and at this moment, the whole array is operated in a pixel-level parallel processor mode. When the Rflag is set to 1, the reconfiguration multiplexers select input data at the "SOM" terminal, and at this moment the whole array is operated in a SOM neural network mode.

In the above technical solution, the winning flag register Wflag33, the sign flag register Sflag 34 and the overflow flag register OVflag35 are only operated in the SOM neural network mode.

In the above technical solution, the control signals for the PE units and the flag register file 31 are from decoded output of the combination of the instruction memory and some specific registers in the array controller.

In the above technical solution, the data input and output of the PE unit are different for their different bit-slice position k in the SOM neuron where the concerned PE unit is located. The details are shown as follows:

In a multiplexer relevant to reconfiguration and connected to the first operand selector, for k=15, an arithmetic higher bit should be connected to the own output of the PE unit and a logic higher bit should be connected to the least significant bit (LSB) output of the SOM neuron west to the neuron where the concerned PE is located; and for other values of k, the arithmetic higher bit and the logic higher bit are connected to the output of the adjacent higher bit slice PE of the SOM neuron where the concerned PE is located.

In a multiplexer relevant to reconfiguration and connected to the first operand selector, for k=0, a logic lower bit should be connected to the output of the most significant bit (MSB) of the SOM neuron east to the SOM neuron where the PE is located; for other values of k, the logic low bits are connected to the output of the adjacent lower bit slice PE of the SOM neuron where the concerned PE is located.

In a multiplexer 27 relevant to reconfiguration and connected to the second operand selector, for k<12, the input data at its SOM terminal is OVflag; otherwise, the input data is zero;

for k=12, the result of its ALU may be used to update the value of OVflag and for other values of k, the results of the ALUs can't be used to update the OVflag value;

for k=15, the carry-out of the ALU may be used to update the value of Sflag and for other values of k, the carry-outs of the ALUs function as the carry-in of the ALUs of their corresponding adjacent higher bit slide PEs of the SOM neuron where the concerned PE unit is located in the SOM mode;

for k=0, the carry-in of the ALU in the SOM mode is Sflag; and for other values of k, the carry-ins are the carry-outs of their corresponding adjacent lower bit slide PEs of the SOM neuron wherein the PE unit is located.

In the above technical solution, the whole dynamically reconfigurable parallel image processing element array and self organizing map (SOM) neural network 2 is enabled to operate in a pixel-level parallel processing mode (the equivalent view is shown in FIG. 4a) or a self-organizing map (SOM) neural network mode (the equivalent view is shown in FIG. 4b) according to different values of the reconfiguration flag register Rflag32.

In the above technical solution, when the reconfigurable parallel image processing element array and self-organizing map (SOM) neural network 2 is operating in a pixel-level parallel processor mode, each of the PE units receives identical control instruction and processes different data in their local 1-bit width memory 40. The PE unit may implement a basic 1-bit addition operation, complementary operation, "AND" or "OR" logic operations based on a memory access manner of "read-modify-write" during a single clock cycle. A fixed-point multiple-bits arithmetic or logic operation for low- and middle-level image processing can be realized in a 1-bit ALU 37 in the pixel-level parallel processing PE unit by being decomposed into basic 1-bit serial operations as mentioned above. The carry-out generated during operation is stored into a Creg register 38; if the two operands required by the operation are both from the local memory, one of them should be copied to a temporary register Treg39 before each of the bit data are operated, so that the temporally stored data functions as a second operand of the ALU to operate. The PE unit may communicate data with its adjacent four PE units at east, south, west and north in a bandwidth of 1 bit. A data of any number of bits can be communicated between any two of the PE units in the array by a combination of data communications between the adjacent processing elements. In the pixel-level parallel processor mode, all of the PE units have the same function which is irrespective of their bit slice position k. Meanwhile, the flag register file 31 is out of function.

In the above technical solution, when the reconfigurable parallel image processing element array and self-organizing map (SOM) neural network 2 is operating in a SOM neural network mode, a reference vector and an external input vector stored internal to every SOM neuron are unsigned fixed-point numbers. In order for the intermediate result during operation not to overflow, the supported maximum dimensions of the vector should be limited according to the effective bits of the vector components; the input vectors are provided externally from the system in the order of its components and each of the components are simultaneously broadcasted to all of the SOM neurons.

In the above technical solution, on the assumption that each of the SOM neurons has obtained a reference vector in some manner and stores it into the memory 41 with a bit width of 16, for a SOM neuron winning judging stages common to the training and recognition process in the SOM neural network, each of the SOM neurons first simultaneously calculates a block distance between the input vector and its own reference vector. The block distance is the sum of absolute differences (SAD) between each of the corresponding components of the two vectors. The calculation of the absolute difference can be implemented by utilizing bit inverse and bit addition of the ALU in conjunction with the sign flag register Sflag; absolute difference for each of the components is calculated and accumulated to obtain a final distance which is a unsigned fixed-point number of 16 bits; then the distances calculated for each of the SOM neurons are input to the RP array in parallel to compare their values, and coordinates of the winning SOM neuron, which has the minimum distance value are exacted for final determination of classes for the image feature recognition, or for adjustment of the reference vector during the SOM neural network training stage.

For a stage of adjustment of the reference vectors, which only exists during training, the external processor of the system set the winning flag register Wflag to be 1 for all of the SOM neurons with a distance to the winning SOM neuron smaller than a certain value to be 1, while set the Wflag to be 0 for all other neurons. Thus only the neurons within the winning regions may update their reference vectors. When the reference vector is updated, the components of the reference vector are adjusted with respect to the direction which is the same as or opposite to that of the input vector according to whether the result of classifying is right, and the amplitude of the adjustment is proportional to the difference between the corresponding component in the input vector and the reference vector; the multiplication by the coefficient of proportionality can be realized by proper combination of addition, subtraction and bit-shifting operations in the SOM neural network mode. The bit-shifting operation is implemented via the data communications of adjacent PE units in the SOM neural network mode. The addition operation and subtraction operations related to the adjustment of the reference vector are implemented by bit inverse and bit addition of the ALU 42 in conjunction with the sign flag register Sflag. If the adjusted reference vector component does not range between 0 and the limit defined by the effective number bits of the vector components as mentioned above, a cut-off renormalization is need, which compulsively set all the negative numbers to be 0 and set all of the numbers higher than the limit to be the limit, so as to guarantee the SAD addition result for the next stage of winning determination would not be larger than 16 bits. The cut-off renormalization should be assisted by the Sflag and OVflag flag registers.

In the above technical solution, the row processor RP array 5 can be used to implement grey-scale morphologic operations, image feature extraction and the extraction of coordinates of the winning SOM neuron, for the assistance of the reconfigured SOM neural network. One RP 5 comprises a 8-bit ALU 46, a 8-bit shift register 43, two operand selectors (44-45), a condition generator 47 based on a dual-input "AND" gate and a general register file 48 with a depth of V and a bit width of 8-bits.

In the above technical solution, for the RP array 5, each of the row processor RP units can implement arithmetic operations of 8-bits including addition, subtraction, calculating of absolute value, arithmetic/logic shift and data comparison, so that a data larger than 8-bits may be decomposed into a number of operations less than or equal to 8-bits and operated in a byte-serial manner. The RP unit supports conditional operations and the condition flag is from a previous calculating result flag of the ALU 46 and functions as a write enable signal for the register file 48.

In the above technical solution, in the RP array 5, each of the RP units can communicate data with the nearest RP units at its upper and lower sides, and some RP units can even communicate data with two other RP units which is spaced from S rows at its upper and lower sides. Those RP units constitute a RP skip chain for rapidly accomplishing global image processing operations.

In the above technical solution, the 8-bit shift register 43 in each of the RP are serially connected to implement a cross shift which includes a word parallel shift along a vertical direction and a bit serial shift along a horizontal direction, so that the reconfigurable PE array and the SOM neural network, the RP array, and the modules outside the array processors can communicate with each other to input and output data.

3) Advantageous Technical Effect

As can be seen from the technical solutions as mentioned above, the present invention has the following advantageous technical effect:

1) The present invention proposes a dynamically reconfigurable multi-level parallel single instruction multiple data array processing system which has functions of local image processing and global image processing. It supports flexible and rapid low- and middle-level image processing for image feature extraction. Such a system can be dynamically reconfigured into SOM neural network in a low cost of performance and area. The SOM neural network supports high-level image processing such as a high speed online neural network training and image feature recognition. For most of the typical vision image processing applications, the speed of such a system accomplishing a complete vision image processing including image feature extraction and image feature recognition may exceed 1000 frames per second.

2) The present invention proposes a dynamically reconfigurable multi-level parallel single instruction multiple data array processing system in which the reconfigured SOM neural network supports high-level image processing functions such as a high speed online neural network training and image feature recognition for the first time. The consumed time of high-level image processing is close to that of low- and mid-level image processing. It provides a solution for a vision chip and vision processor in a lower cost and on one single chip to implement a complete vision image processing in a high system speed.

3) The present invention proposes a dynamically reconfigurable multi-level parallel single instruction multiple data array processing system, which has advantages of high processing speed, high integration level, low power consumption, low implementation cost and a dynamical reconfigurability, may be applied to a wide variety of embedded applications of high speed and real-time vision image processing systems. It can implement various high speed and intelligent vision applications including high speed target tracking, natural human-computer interaction, environment monitoring, intelligent transportation, robot vision and so on.

4) The present invention proposes a dynamically reconfigurable multi-level parallel single instruction multiple data array processing system in which the PE array can be dynamically reconfigured as a SOM neural network at a low cost of performance and areas. The SOM neural network can implement high-level image processing functions such as a high speed online neural network training and image feature recognition with the assistance of RP array. It completely overcomes the defect that a high-level image processing can't be done by a pixel-level parallel processing array in the existing programmable vision chip and parallel vision processor, and facilitate an intelligent and portable high speed real-time on-chip vision image system with a complete function at low device cost and low power consumption.

BRIEF DESCRIPTION OF THE DRAWINGS

It is apparent for those skilled in the art about various advantages and benefits by reading detailed illustration of the preferable embodiment of the present invention. The accompany figures is for purpose of illustration and is not intended to limit the present invention. In all of the figures, identical reference signs are used to indicate identical components.

DETAILED DESCRIPTION

The objects, technical solutions and advantages become apparent by further illustrating the present invention in detail in connection with the particular embodiments and with reference to the accompany figures.

It should be noted that in the accompany figures or description, similar or identical components are indicated by identical reference signs. In the accompany figures, the elements or implementations not drawn or illustrated are those which are known for those skilled in the art. Furthermore, although an example of a parameters including specific value may be provided, it should be noted that it is not necessary for the parameter to be exactly identical to the corresponding values; on the contrary, the parameters may be approximately equal to the corresponding values in an acceptable error margin or design constraints.

Figure 1:
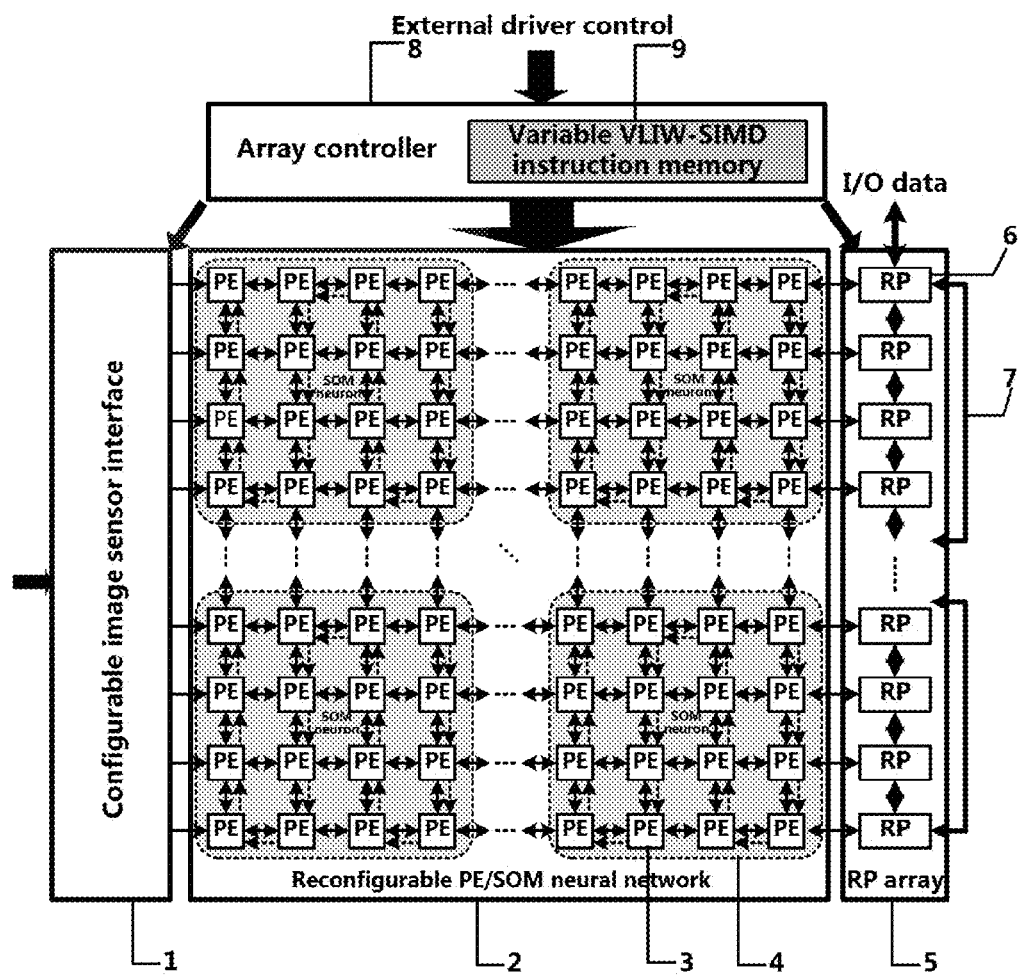
FIG. 1 is a schematic view of a dynamically reconfigurable multi-level parallel Single instruction multiple data array processing system according to embedment of the present invention.

One embodiment of the present invention provides a dynamically reconfigurable multi-level parallel single instruction multiple data array processing system. As shown in FIG. 1, the dynamically reconfiguration multi-level parallel single instruction multiple data array processing system supports to dynamically reconfigure a pixel level parallel image processing element array to a self organizing map SOM neural network so as to be applied for rapid feature extraction and feature recognition of a high speed vision image on a high speed on-chip vision system. The system comprises: a configurable image sensor interface 1, r dynamically reconfigurable parallel image processing element array and self organizing map (SOM) neural network (reconfigurable PE/SOM neural network) 2, row processor (RP) array 5 which is operated parallel and an array controller 8.

In the embodiment as shown in FIG. 1, the configurable image sensor interface 1 is used to receive a pixel data from an image sensor serially or in parallel and output the pixel data in row-parallel to a subsequent multi-level parallel processing module to be processed. Such an interface may flexibly implement region selection and sub-sampling of the original image data stream by the parameter configuration.

The reconfigurable PE/SOM array 2 is with dynamical reconfigurability to be an M×M pixel-level parallel processing element (PE) array or an (M/4)×(M/4) self organizing map (SOM) neural network. The former one may implement low and middle level of image processing (image feature extraction) and the latter one may implement a high level image processing (image feature recognition).

The row-parallel row processor (RP) array 5 is used to assist the reconfigurable PE/SOM array 2 to implement relative image processing tasks during the respective stages of image processing adapted to being parallel processed by row, to implement a rapid nonlinear processing and a global image processing, and to communicate date with exterior of the system.

The array controller 8 is used to, under control of a driver external to the system, read control instructions for controlling the reconfigurable PE/SOM array 2 and the RP array 5 from a variable very long instruction word single instruction multiple data (Variable VLIW-SIMD, VVS) instruction memory internal to the system, and is used to decode the control instructions along with some values of their own specific registers to be output to the reconfigurable PE/SOM array 2 and the RP array 5 as an array control signal. These instructions may be instruction consequence for the PE/SOM array of 32-bit or the RP array to individually operate, or may be a very long instruction word (VLIW) sequence for the PE/SOM array of 64-bit and the RP array to cooperate with each other, the types of which may be dynamically switched during execution of the program to meet various requirements of the algorithm.

In the embodiment as shown in FIG. 1, the reconfigurable PE/SOM array 2 comprises M×M of fine-grained parallel image processing element PE3 which are operated in a single instruction multiple data SIMD mode in a pixel-level parallel fashion or may be dynamically reconfigured to be a (M/4)×(M/4) self organizing map (SOM) artificial neural network. Every block of 4×4 PE sub-array 4 in the reconfigurable PE/SOM array 2 may be dynamically reconfigured to be one SOM neuron in the SOM neural network. After reconfiguration, the topological connections of the adjacent PE units are indicated by a dotted bidirectional arrow from a solid bidirectional arrow of FIG. 1.

Figure 2:
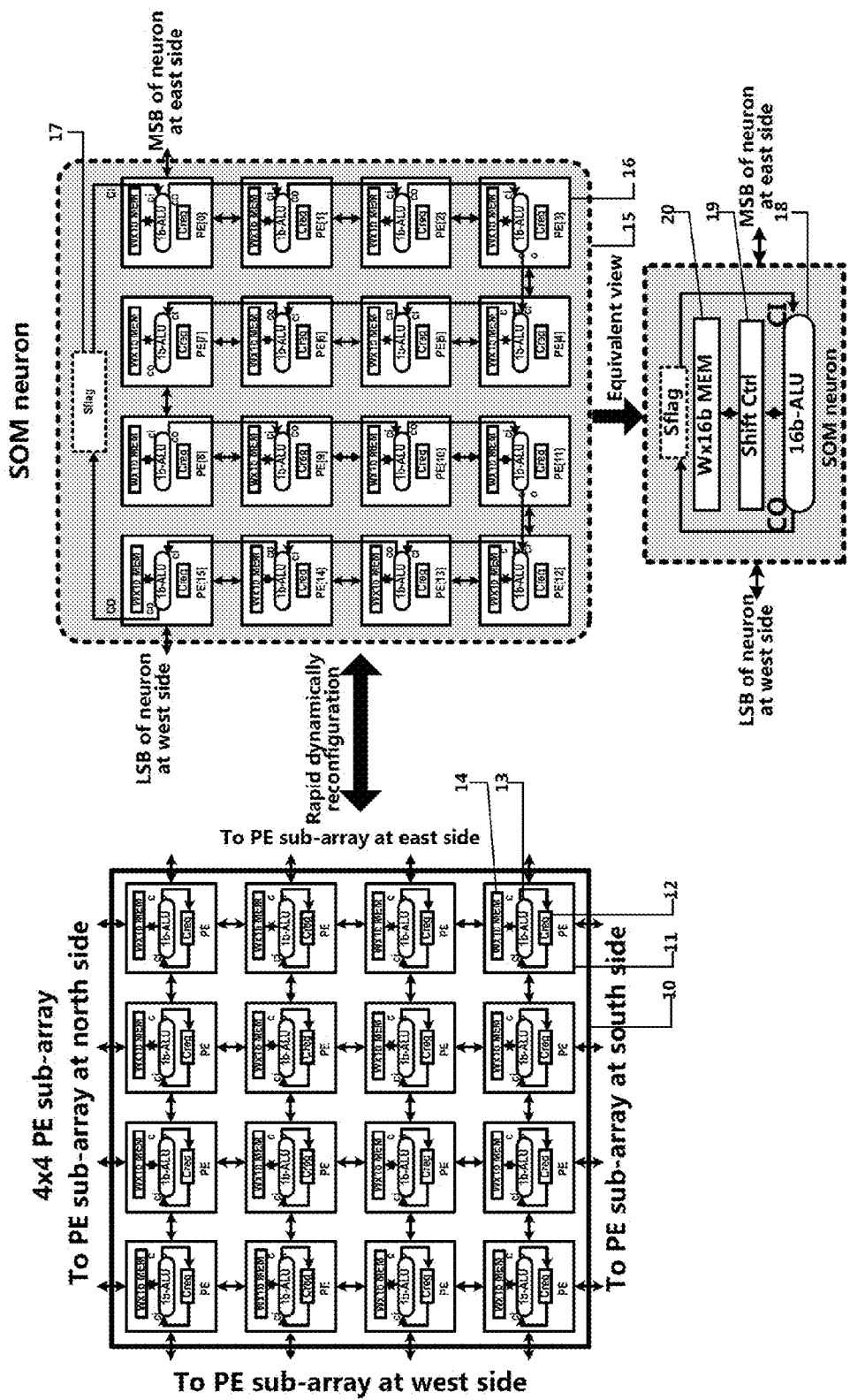
FIG. 2 is a schematic view of a topological connection of a 4×4 PE sub-array according to embodiment of the present invention before and after reconfiguration.

As shown in FIG. 2, before the 4×4 PE sub-array 4 is reconfigured into an SOM neuron, every PE unit 11 is connected to its four nearest PE units (the PE units on the boundary of the sub-array is connected to the nearest PE unit of the adjacent sub-array) and communicates data with them in a bandwidth of 1 bit. Every PE unit comprises a one bit arithmetic logic unit (ALU) 13, one carry register (Creg) 12 and a local memory 14 with a bit width of 1 and a bit depth of W. Operands of the arithmetic logic unit are from memories in its own PE unit or the adjacent PE unit. The carry-out generated during the operation are stored into the carry register in the PE unit and functions as an carry-in of the arithmetic logic unit for the next operation, so as to implement a multiple bit operation in such a bit-serial fashion.

In a SOM neuron 15 which is reconfigured based on the 4×4 PE sub-array 4, the topological connections of the PE units changes 16 and each PE unit acts as one "bit-slice" of the reconfigured SOM neuron. In other words, every PE units contribute corresponding operation sources and memory sources to some bit in the SOM neuron where the concerned PE unit is located. So it is mapped to be some bit in the SOM neuron. At this moment, the PE unit can only be connected to two PE units which are mapped to the adjacent bits and communicated data with them (which represent the PE units in the most high and lest low bits in the SOM neuron are connected to the corresponding PE units at left and right neighboring SOM neurons) and the band width is increased to be two bit including one bit of memory data communication and one bit of carry data communication. Such a connection may implement a shift operation independent of ALU so as to implement rapid multiplication and division operations and load in/out the reference vector and the recognition results to the whole neural network. Furthermore, every carry-out of the PE unit functioning as one "bit slice" is not stored into its own carry register, but directly functions as a carry-in of the arithmetic logic unit in the adjacent "bit slice" PE at higher bit position among the reconfigured SOM neurons. Thus, the arithmetic logic units for all of the 4×4 PE units are connected together to form one 16-bit arithmetic logic unit (ALU). The final carry-out of such a 16-bit ALU is saved into a sign indicator register 17 of the neuron and functions as a carry-in or a conditional operation indicator for the subsequent operations. Since the respective bit operands of the 16-bit arithmetic logic unit are simultaneously from the memories of all the PE units 16, so the neuron corresponds to a local memory 20 with a bit width of 16 and a bit depth of W.

The whole SOM neuron 1 obtained by reconstructing the 4×4 PE sub-array is equivalent to a structure as shown in low-right portion of FIG. 2. The neuron comprises one 16-bits ALU 18, one shift control unit 19, a local memory 20 with a bit width of 16 and a bit depth of W, a 16-bit temporal register, as well as a few flag registers (such as Sflag register). The neuron may communicate data with its left and right neurons in a communication bandwidth of 1 bit.

Figure 3:
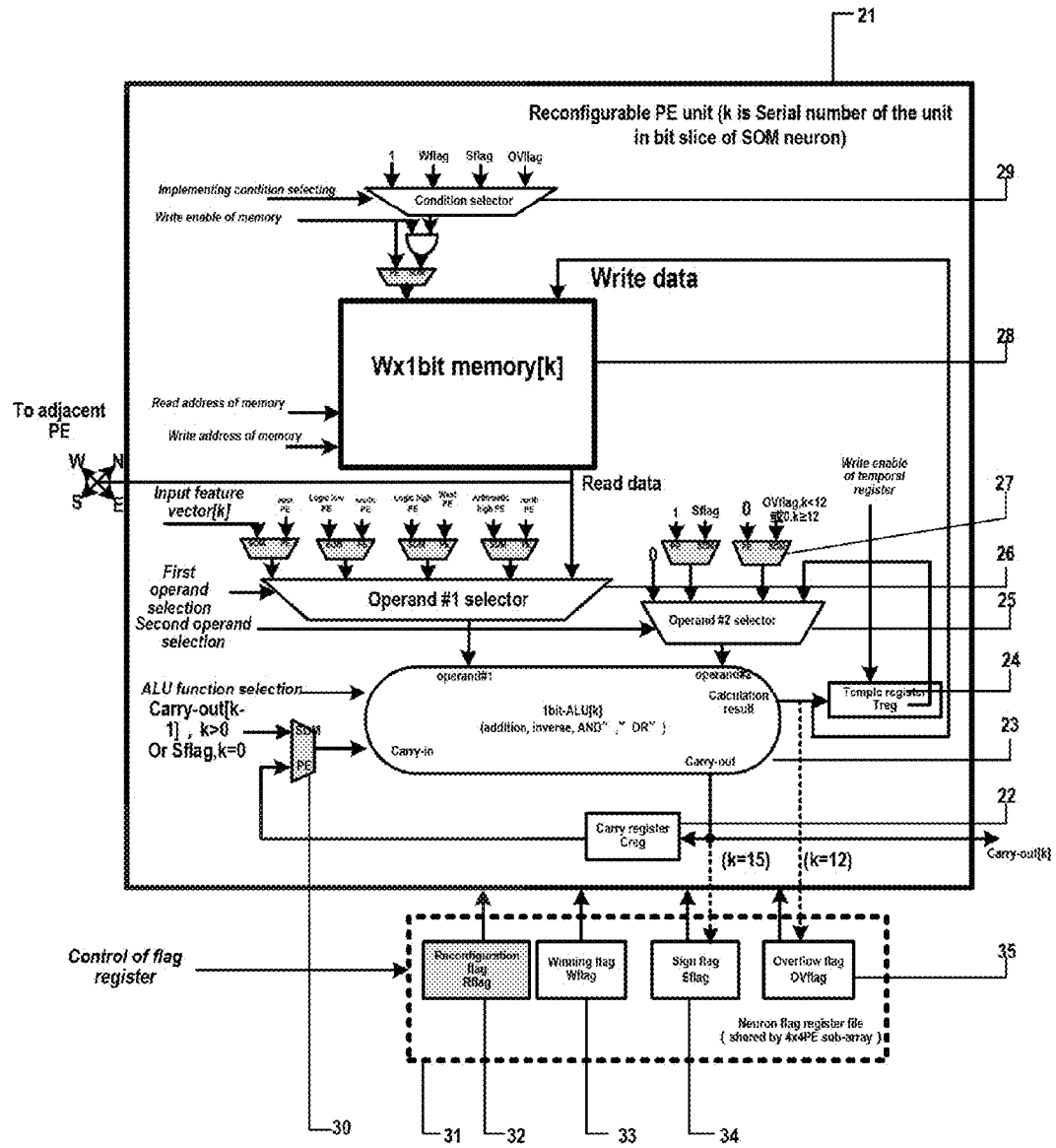
FIG. 3 is a schematic structure of the PE unit according to embodiment of the present invention.

In FIG. 2, the particular circuit arrangement of the PE unit 21 comprises one 1-bit ALU unit 23, a first operand selector 26, a second operand selector 25, a local dual-port memory 28 with a bit width of 1-bit and a bit depth of W, one condition selector 29, one carry register (Creg) 22, one temporary register (Treg) 24 and some multiplexers relevant to reconfiguration. The two inputs of these multiplexers relevant to reconfiguration are marked as "PE" and "SOM" which represent to implement a data selection function relevant to reconfiguration, in particular which are shown by grey portions (27, 30 and the like) in the PE units as shown in FIG. 3.

In order to reconstruct to form a self organizing map neural network, the PE units in each 4×4 PE sub-array 4 further share one additional flag register 31, and such a flag register file 31 is constituted of four 1-bit flag registers which are reconfiguration flag register (Rflag) 32, winning flag register (Wflag) 33, sign flag register (Sflag) 34 and overflow flag register (OVflag) 35. The flags of the flag register file 31 are output to the PE unit for some data selection control and their values can be updated by outputs of some PE units and/or external control signals from the array instructions. The reconfiguration flag register Rflag 32 implements the dynamical reconfiguration by controlling the reconfiguration multiplexer to change topological connections among the PE units. When the Rflag is set to 0, the respective reconfiguration multiplexers select input data at the "PE" terminal, and at this moment, the whole array is operated in a pixel-level parallel processor mode. When the Rflag is set to 1, the reconfiguration multiplexers select input data at the "SOM" terminal, and at this moment the whole array is operated in a SOM neural network mode. The Wflag, Sflag and OVflag are only operated in a SOM neural network mode. The control signals (as shown by italics in FIG. 3) for the PE unit and the flag register file are from decoded output of the combination of the instruction memory and some specific register in the array controller. Since the total area occupied by the multiplexer relevant to the reconfiguration in the PE unit is 4% of the whole PE, the area overhead of the reconfiguration is little.

The data input and output of the PE unit are different for their different bit-slice position k in the SOM neuron where the concerned PE unit is located. The details are shown as follows:

1) in a multiplexer relevant to reconfiguration and connected to the first operand selector, for k=15, an arithmetic higher bit should be connected to the own output of the PE unit and a logic higher bit should be connected to the least significant bit (LSB) output of the SOM neuron west to the neuron where the concerned PE is located (as shown in FIG. 2); and for other values of k, the arithmetic higher bit and the logic higher bit are connected to output of the adjacent higher bit slice PE of the SOM neuron where the concerned PE is located;

2) in a multiplexer relevant to reconfiguration and connected to the first operand selector, for k=0, a logic lower bit should be connected to the output of the most significant bit (MSB) of the SOM neuron east to the SOM neuron where the concerned PE is located; for other values of k, the logic lower bits are both connected to the output of the adjacent lower bit slice PE of the SOM neuron where the concerned PE is located;

3) in a multiplexer 27 relevant to reconfiguration and connected to the second operand selector, for k<12, the input data at its SOM terminal is OVflag; otherwise, the input data is zero;

4) for k=12, the result of its ALU may be used to update the value of OVflag and for other values of k, the result of the ALUs can't be used to update the OVflag value;

5) for k=15, the carry-out of the ALU may be used to update the value of Sflag and for other values of k, the carry-outs of the ALUs function as the carry-in of the ALUs of their corresponding adjacent higher bit slide PEs of the SOM neuron where the concerned PE unit is located in the SOM mode; and 6) for k=0, the carry-in of the ALU in the SOM mode is Sflag; and for other values of k, the carry-ins are the carry-outs of their corresponding adjacent lower bit slide PEs of the SOM neuron where the concerned PE unit is located.

Figure 4A:
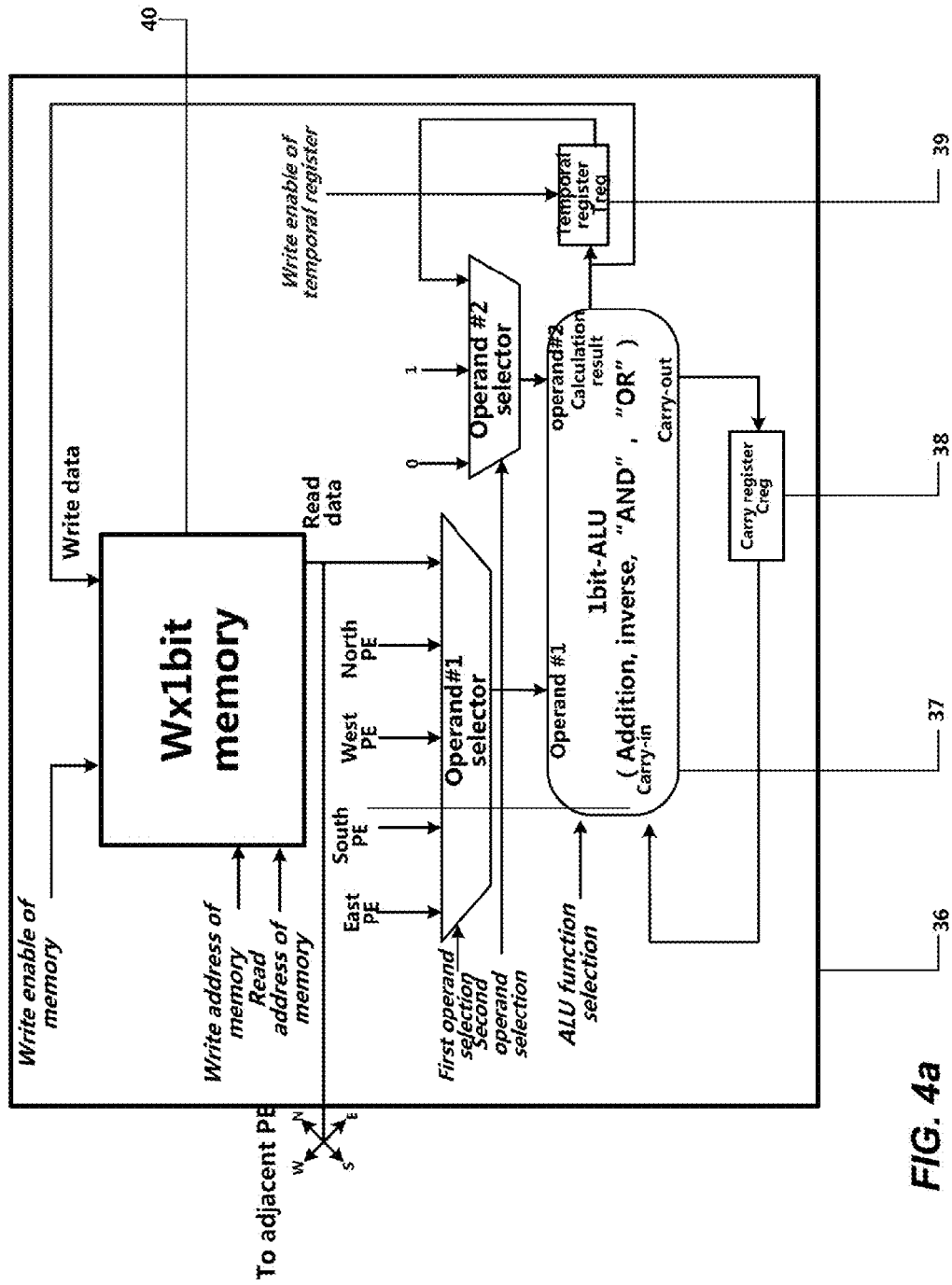
FIG. 4a is an equivalent circuit of the PE unit operated in a pixel level parallel mode according to embodiment of the present invention.
Figure 4B:
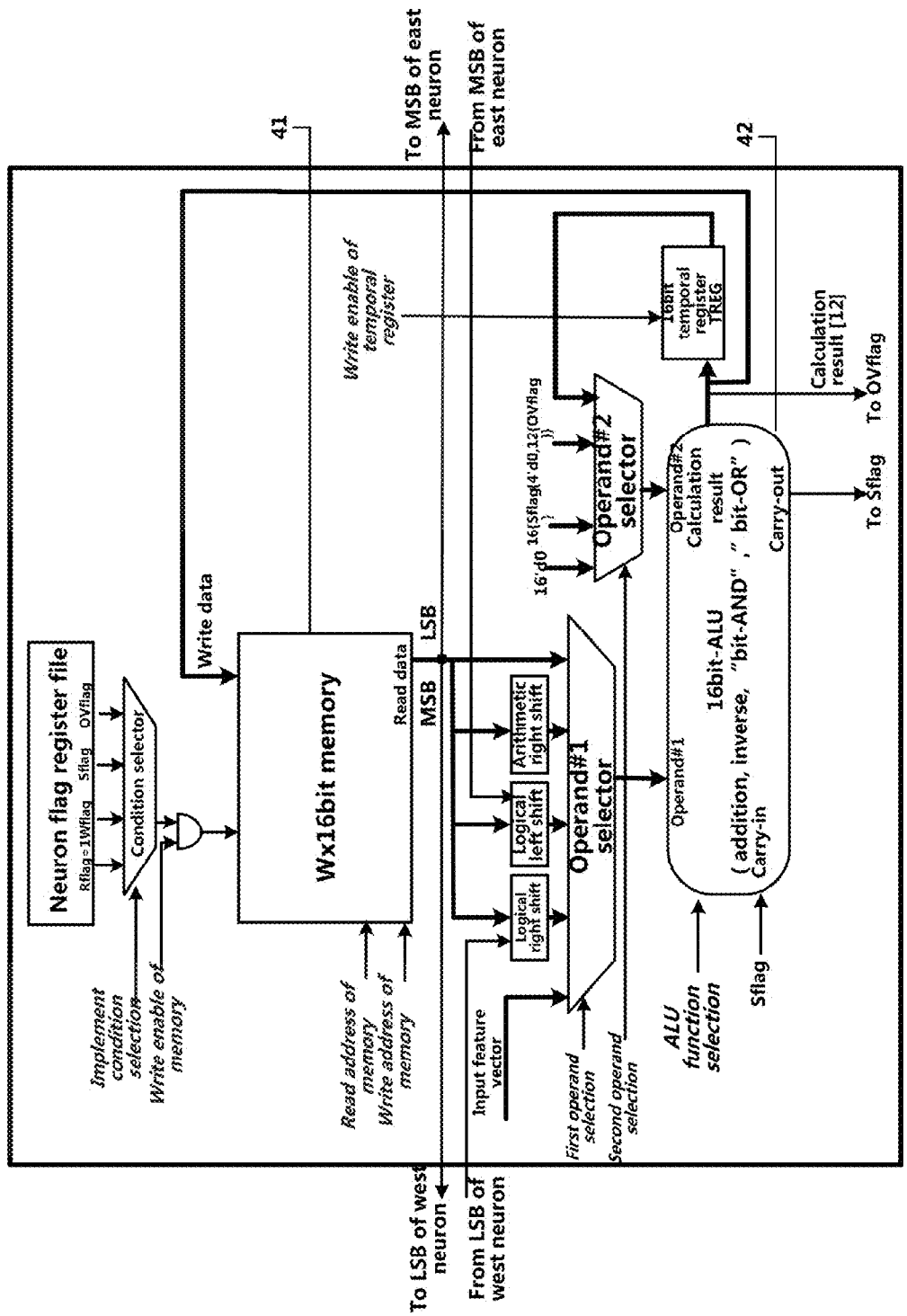
FIG. 4b is an equivalent circuit of the SOM neuron (4×4 PE sub-array) operated in SOM mode according to embodiment of the present invention.

The whole reconfigurable PE/SOM array 2 is enabled to operate in a pixel-level parallel processing mode or a self-organizing map (SOM) neural network mode according to different values of the reconfiguration flag register Rflag32, and the equivalent circuits in the two operation modes are shown in FIG. 4a and FIG. 4b.

FIG. 4a is an equivalent circuit of the PE unit operated in a pixel-level parallel mode according to embodiment of the present invention, in which the "equivalent" PE unit array is operated in a pixel-level parallel single instruction multiple data (SIMD) mode, each of the PE units receives identical control instruction and processes different data in the local 1-bit width memory 40. The PE unit may implement a basic 1-bit addition operation, complementary operation, "AND" or "OR" logic operation based on a memory access manner of "read-modify-write" during a single clock cycle. A fixed-point multiple bits arithmetic or logic operation for low-level and middle-level image processing can be realized in a 1-bit ALU 37 in the pixel-level parallel processing PE unit by being decomposed into basic 1-bit serial operation as mentioned above. The carry-out generated during operation is stored into a Creg register 38; if the two operands required by the operation are both from the local memory, one of them should be copied to a temporary register Treg 39 before each of the bit data are operated (which can be done by "AND" the bit data and the immediate number 1 in the 1-bit ALU; and at this moment, the first operand of the ALU selects such a bit data and the second operand selects the immediate number 1, and ALU selects a function of "AND", the write enable terminal of the memory is set to 0, and the write enable terminal of Treg is set to 1), so that the temporally stored data functions as a second operand of the ALU to operate. The PE unit may communicate data with its adjacent PE units at east, south, west and north in a bandwidth of 1 bit. A data of any numbers of bits may be communicated between any two of the PE units in the array by a combination of data communications between the adjacent processing elements. In the pixel-level parallel processor mode, all of the PE units have the same function which is irrespective of their bit slice position k. Meanwhile, the flag register file 31 is out of function. The operation of the neuron is very similar to that of the PE unit before reconfiguration except for the bit width for operation and storage is 16-bit and a more complex operation based on a flag bit is need. In a typical situation, the reference vector and the external vector stored internal to each of the neurons include an integer portion of 8-bit and a fractional portion of 4-bit which are unsigned fixed-point numbers. In order for the intermediate result not to overflow, it is specified that the supported maximum dimension of the vector should be limited according to the effective bits of the vector components. The input vectors are provided externally from the system in the order of its components and each of the components are simultaneously broadcasted to all of the SOM neurons.

The operating principle of the neuron will be illustrated in detail in conjunction with training and recognition of a particular SOM neural network, in which it is supposed that each of the SOM neurons has obtained a reference vector in some manner and stores it into the memory 41 with a bit width of 16.

For a SOM neuron winning judging stages common to the training and recognition process in the SOM neural network, each of the SOM neurons first simultaneously calculates a block distance between the input vectors and its own reference vector. The block distance is the addition of absolute difference (SAD) between each of the corresponding components of the two vectors. The calculation of the absolute difference may be implemented by utilizing bit inverse and bit addition of the ALU in conjunction with the sign flag register Sflag; absolute difference for each of the components is calculated and accumulated to obtain a final distance which is a unsigned fixed-point number of 16 bits; then the distances calculated for each of the SOM neurons are input to the RP array in parallel to compare their values, and coordinates of the winning SOM neuron, which has the minimum distance value are exacted for final determination of classes for the image feature recognition or for adjustment of the reference vector during the SOM neural network training stage.

For a stage of adjustment of the reference vectors which only exist during training, the external processor of the system set the winning flag register Wflag to be 1 for all of the SOM neurons with a distance to the winning SOM neuron smaller than a certain value to be 1, while set the Wflag to be 0 for all other neurons. Thus only the neurons within the winning regions may update their reference vectors. When the reference vector is updated, the components for the reference vector are adjusted with respect to the direction which is the same as or opposite to that of the input vector according to whether the result of classifying is right, and the amplitude of the adjustment is proportional to the difference between the corresponding component in the input vector and the reference vector; the multiplication by the coefficient of proportionality can be realized by proper combination of addition, subtraction and bit-shifting operations in the SOM neural network mode. The bit-shift operation is implemented via the data communications of adjacent PE units in the SOM neural network mode. The addition operation and subtraction operations related to the adjustment of the reference vector are implemented by bit inverse and bit addition of the ALU 42 in conjunction with the sign flag register Sflag. If the adjusted reference vector component does not range between 0 and the limit defined by the effective number bits of the vector components as mentioned above, a cut-off renormalization is need, which compulsively set all the negative number s to be 0 and set all of the numbers higher than the limit, so as to guarantee the SAD addition result for the next stage of winning determination would not be larger than 16 bits. The cut-off renormalization should be assisted by the Sflag and OVflag flag registers.

Figure 5:
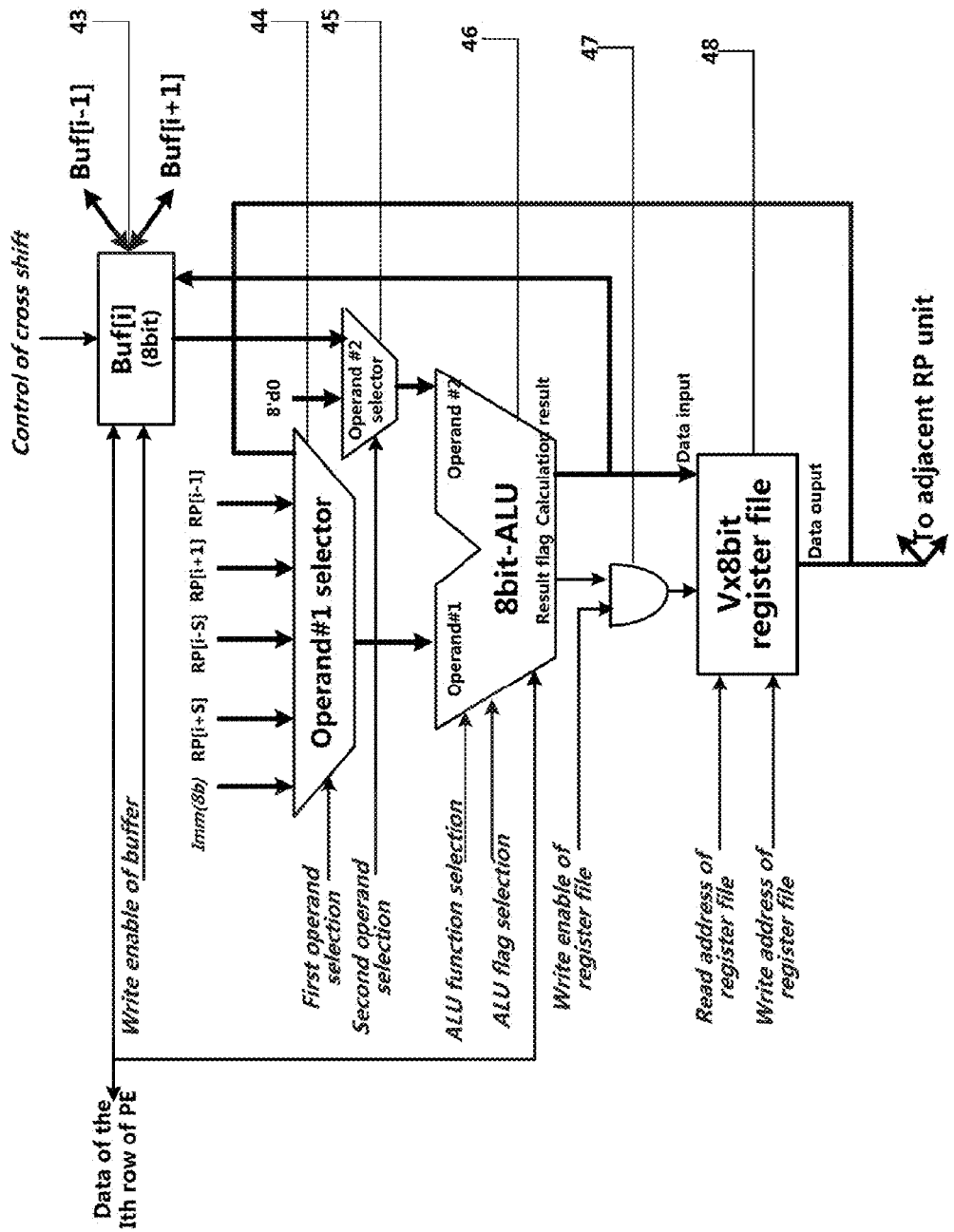
FIG. 5 is a schematic view of the structure of the row processor RP according to embodiment of the present invention.

The circuit of the row processor RP row processor is shown in FIG. 5, which comprises a 8-bit ALU 46, a 8-bit shift register 43, two operand selectors (44-45), a condition generator 47 based on a dual-input "AND" gate and a general register file 48 with a depth of V and a bit width of 8-bits. Each of the row processor RP unit 10 operated in row-parallel is used to implement an arithmetic operation of 8-bits including addition, subtraction, calculating of absolute value, arithmetic/logic shift and data comparison, so that a data larger than 8-bits may be decomposed into a number of operations less than or equal to 8-bits and operated in byte-serial manner. The RP unit supports conditional operations and the condition flag is from a previous calculating result flag of the ALU 46 and functions as a write enable signal for the register file 48. Each of the RP units may communicate data with the nearest RP units at its upper and lower sides, and some RP units can even communicate data with the two other RP units which is spaced from S rows at its upper and lower sides. Those RP units constitute a RP skip chain for rapidly accomplishing global image processing operations.

The 8-bit shift register 43 in each of the RP are serially connected to implement a cross shift (i.e. a word parallel shift along a vertical direction and a bit serial shift along a horizontal direction), so that the reconfigurable PE array and the SOM neural network, the RP array, and the modules outside the array processors can communicate with each other to input and output data. The RP array is mainly used to implement grey-scale morphologic operation, image feature extraction and extraction of ordinates of the won neuron in assistance of the reconfigured SOM neuron.

The dynamically reconfigurable multi-level parallel Single instruction multiple data array processing system proposed by the present invention will be further illustrated in detail in conjunction with a high speed intelligent vision chip and a high speed gesture tracking and recognizing at 1000 fps.

(I) High speed vision intelligent vision chip

By referring to the embodiment shown in FIG. 1, the size of the PE array is 64×64 (equivalently, the size of the SOM neuron array is 16×16), and each of the PE units comprises a local memory of 64×1 bit (i.e. W=64). The size of the RP array is 64×1. Each of the RP processor comprises a general register file of 16×8 bit (i.e. V=16). The VVS instruction memory in the array controller is 1024×64 bit.

Figure 6:
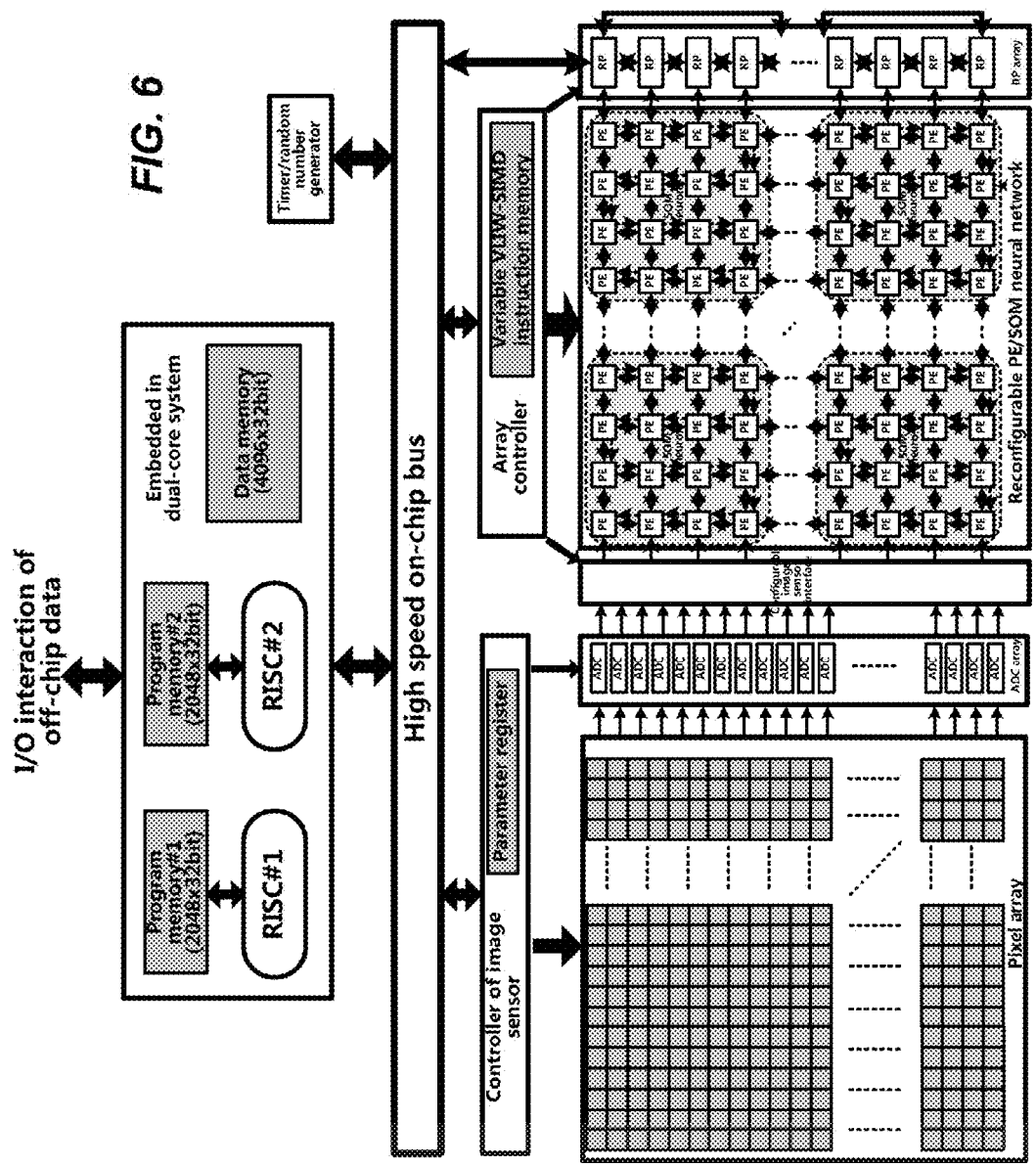
FIG. 6 is a schematic view of a high speed and intelligent vision chip architecture based on a reconfigurable PE array and SOM neural network system according to embodiment of the present invention.

FIG. 6 is a high speed and intelligent vision chip integrating the system of the present invention. Except for the reconfigurable PE/SOM array, RP array, image sensor interface and VVS array controller as shown in FIG. 1, the high speed and intelligent vision chip further comprises corresponding CMOS image sensor (including a four-tube pixel element array of 256×256), embedded in dual-core system (including dual RISC core and corresponding data memory and RISC program memory) and a timer/random number generator (for monitoring the course of the dual core RISC, switching course and randomly initializing the reference vector for the SOM neuron). The vision chip may meet the requirements of image resolution and performance for most of the high speed and intelligent vision image processing applications.

In the present embodiment, the high speed CMOS image sensor captures image data in a frame interval of 80 μs and converts the image data into a digital signal of 8 bit or 10 bit to be input to the PE array parallel. Then, the image data are processed in a full-pixel-parallel manner and a row-parallel manner in the PE array and the RP array so as to rapidly extract image feature in the low and middle level of image processing. Then, the PE array is reconfigured to be a SOM neural network and the obtained feature vector is processed in a parallel vector (leaning and recognizing) and finally the result of calculation is input to the dual core processing system to be further processed to get the final recognition result. The dual core processing system is operated in a thread parallel manner and is mainly used for high level processing except the feature recognition, feedback and adjustment of parameters of the image sensor and control of the respective portions of the whole system to cooperate synchronistically.

The time consumed by the digital processing portion generally ranges between 20-800 μs at a clock frequency of 100 MHz for different applications (the process of feature recognition in the SOM neural network is less than 15 μs), so the whole system may be operated at 1000 fps and especially be operated over 10000 for some simple applications.

(II) High speed gesture tracking and recognizing at 1000 fps

Figure 7:
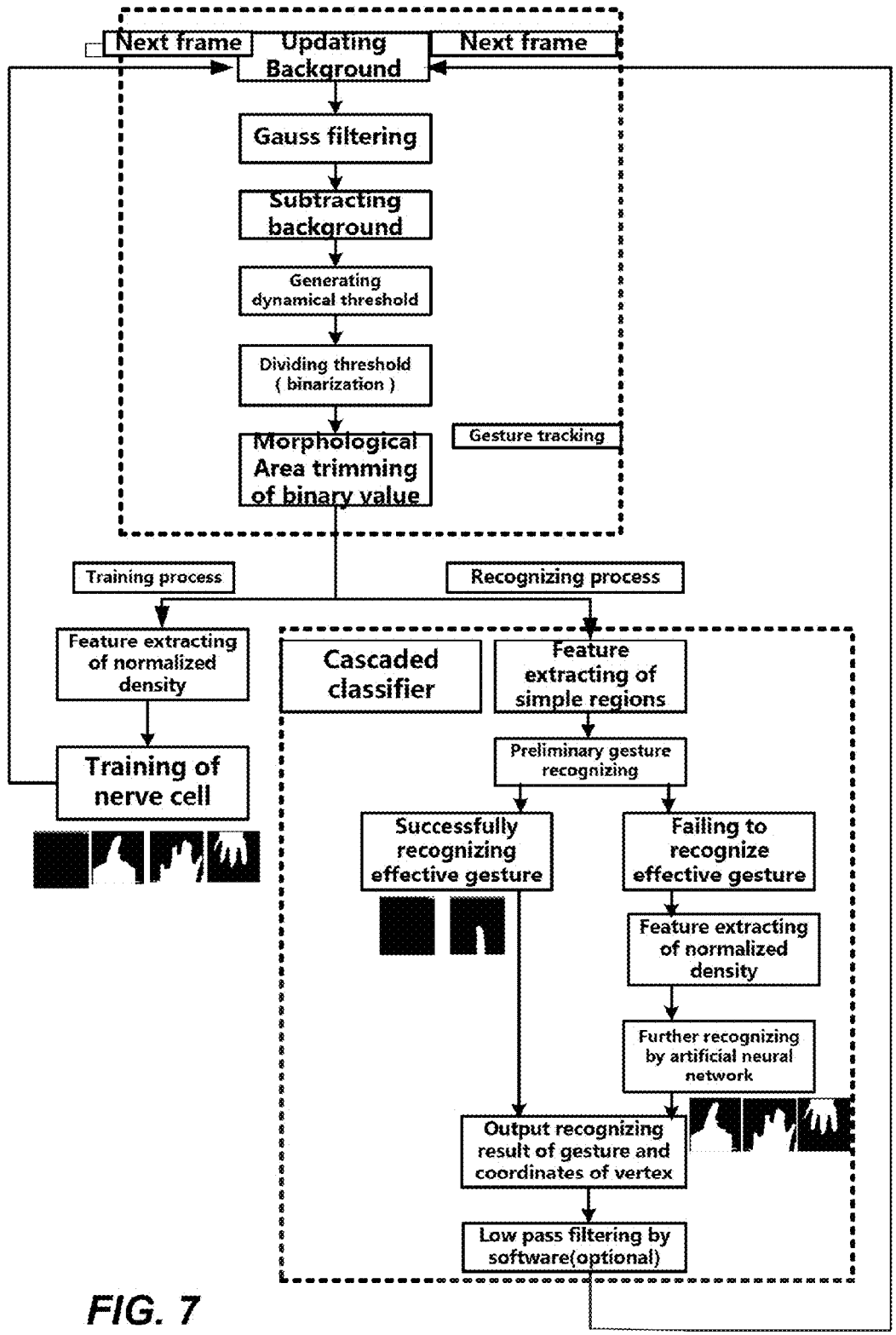
FIG. 7 is a flowchart of a high speed gesture tracking and recognizing algorithm for a vision chip at 1000 fps according to embodiment of the present invention.

FIG. 7 is a flowchart of a high speed gesture tracking and recognizing algorithm for a vision chip according to embodiment of the present invention. The present invention proposes a gesture recognizing algorithm for recognizing of four gestures. The algorithm may be mainly applied to a PPT gesture control system based on a natural human-computer interaction.

In the gesture recognizing algorithm, the gesture tracking portion comprises six steps from background updating to two value morphological trimming, in which the two value morphological trimming refers to removing of small stray region and filling of small voids in a large block regions by utilizing the two value morphological region trimming algorithm. The final large block of whole region is the region for recognizing the gestures. The subsequent portions belong to a stage of gesture recognizing. The reconfigured SOM neural network has to be completely trained so as to recognize. During training, the RP array is used to extract renormalized density feature in the gesture recognizing region and its particular algorithm is shown as follows: the region where the gesture is located is averagely divided into some rows and some columns and the ratio of the active pixels in each row and each column with respect to the whole area of the region are calculated, respectively. Those ratios constitute one group of vectors. The process of learning can be completed on line in the SOM neural network at a high speed (for a feature vector of 16 dimensions, the time for one cycle of training is less than 5 ms).

The process of recognizing follows the process of learning. It should be noted for two special situations for recognizing gestures (i.e. an "empty" gesture without regions to be recognized and a special gesture of mouse moving including only one finger). In order to accelerate feature recognizing, the algorithm utilizes a cascade classifier base on combination of simple region feature and SOM neural network. Such a classifier firstly extract simple features of the region to be recognized (such as total number of active pixels, shape parameters, coordinates of vertex and the like) and tries to recognize the special gesture by the RISC core; if failed, it further extracts a complex and complete normalized density feature and utilizes the SOM neural network to uniformly recognize, and finally outputs class code of the recognized gesture and the coordinates of the vertex of the gesture (the coordinates of the vertex is used to particularly control position and direction of the movement of the mouse).

Since during most of time during a typical application there are the two special gestures, the whole processing speed may be greatly improved and an average frame rate may reach above 1000 frames. High frame rate is advantageous to further utilize RISC to check the recognizing result to implement a time-domain low pass filter based on software to suppress interference of the environment and dithering of gestures on the recognizing result. Actually, more classes of gestures may be defined to meet more application requirements and could not increase time consumed by the recognizing process since it is determined by the nature of the SOM neural network. Furthermore, such a property determines that for different applications, the time consumed by the process of feature recognizing is only proportional to the dimensions of the feature vector. Since the time of low and middle levels of image processing is generally short, the final frame rate can be nicely predicted for different applications without previously knowing the particular algorithm.

To sum up, the present invention proposes a dynamically reconfigurable multi-level parallel single instruction multiple data array processing system which has a core of pixel level parallel image processing element array to synchronously implement the functions of local image processing and a global image processing, supports flexible and rapid processing for the low and middle level of images to implement image feature extraction. Such a system may dynamically reconfigure a SOM neural network in a low cost of performance and area, and the neural network supports high level image processing functions such as a high speed online training and feature recognition. For most of typical vision image processing applications, the speed of such a system for accomplishing a complete vision image processing including image feature extraction and image feature recognition may exceed 1000 frames per second.

The objects, technical solutions and advantages become apparent by further illustrating the present invention in detail in connection with the particular embodiments. It should be noted that the above description is only a particular embodiment of the present invention is not used to limit the present invention. Any modification, replacement and improves within the spirit and principle of the present invention should be included in the scope of the present invention.

We claim:

1. A dynamically reconfigurable multi-level parallel single instruction multiple data array processing system, which is applied for rapid image feature extraction and feature recognition of high speed vision image on a high speed on-chip vision system, the system comprising:
   a configurable image sensor interface (1) used to receive pixel data from an image sensor serially or in parallel and to output the pixel data in row-parallel to a subsequent dynamically reconfigurable parallel image processing element array and self organizing map (SOM) neural network (2);
   the dynamically reconfigurable parallel image processing element array and self organizing map (SOM) neural network (2) with dynamical reconfigurability to be an M×M pixel-level parallel processing element (PE) array or an (M/4)×(M/4) self organizing map SOM neural network so as to implement image feature extraction and image feature recognition during the respective stages of the image processing, wherein M is a natural number;
   a row processor array (5) used to assist the dynamically reconfigurable parallel image processing element array and self organizing map (SOM) neural network (2) to implement relative image processing tasks during the respective stages of image processing adapted to being parallel processed by row, to implement a rapid non-linear processing and a global image processing, and to serially shift in data and output processing results under external control of the system; and
   an array controller (8) used to, under control of a driver external to the system, read control instructions for controlling the dynamically reconfigurable parallel image processing element array and self organizing map (SOM) neural network (2) and the RP array (5) from a variable very long instruction word single instruction multiple data VVS instruction memory internal to the system, and used to decode the control instructions along with some values of their own specific registers to be output to the dynamically reconfigurable parallel image processing element array and self organizing map (SOM) neural network (2) and the RP array (5) as an array control signal.

2. The dynamically reconfigurable multi-level parallel single instruction multiple data array processing system according to claim 1, wherein dynamically reconfigurable parallel image processing element array and self organizing map (SOM) neural network (2) comprises M×M of fine-grained parallel image processing element PE (3) which are operated in a single instruction multiple data SIMD mode in a pixel-level parallel fashion.

3. The dynamically reconfigurable multi-level parallel single instruction multiple data array processing system according to claim 2, every block of 4×4 PE sub-array (4) in the dynamically reconfigurable parallel image processing element array and self organizing map (SOM) neural network (2) is able to be dynamically reconfigured to be one SOM neuron in the SOM neural network.

4. The dynamically reconfigurable multi-level parallel single instruction multiple data array processing system according to claim 3, wherein before the 4×4 PE sub-array 4 is reconfigured into an SOM neuron, every PE unit (11) is connected to its four nearest PE units and communicates data with them in a bandwidth of 1 bit.

5. The dynamically reconfigurable multi-level parallel single instruction multiple data array processing system according to claim 4, wherein the PE unit on boundaries of the 4×4 PE sub-array 4 is connected to the PE unit of the adjacent 4×4 PE sub-array 4 and communicates data with them.

6. The dynamically reconfigurable multi-level parallel single instruction multiple data array processing system according to claim 4, wherein every PE unit comprises a one bit arithmetic logic unit ALU (13), one carry register Creg (12) and a local memory (14) with a bit width of 1 bit and a bit depth of W, wherein W is a natural number; operands of the arithmetic logic unit (13) are from memories in its own PE unit or the adjacent PE unit; the carry-out generated during the operation are stored into the carry register in the PE unit and functions as a carry-in of the arithmetic logic unit for the next operation, so as to implement a multiple bit operation in such a bit-serial fashion.

7. The dynamically reconfigurable multi-level parallel single instruction multiple data array processing system according to claim 3, wherein the 4×4 PE sub-array (4) is reconfigured to be one neuron (15) in the SOM neural network, in which topological connections of the PE units changes, and each PE unit acts as one "bit-slice" of the reconfigured SOM neuron; every PE units contribute corresponding operation sources and memory sources to some bit in the neuron where the PE unit is located, so it is mapped to be some bit in the SOM neuron; at this moment, the PE unit is only connected to two PE units which are mapped to the adjacent bits and communicated data with them, and the band width is increased to be two bit including one bit of memory data communication and one bit of carry data communication.

8. The dynamically reconfigurable multi-level parallel single instruction multiple data array processing system according to claim 7, wherein every carry-out of the PE unit functioning as the "bit slice" is not stored into its own carry register, but directly functions as a carry-in of the arithmetic logic unit in the adjacent "bit slice" PE at higher bit position among the reconfigured SOM neurons; the arithmetic logic units for all of the sixteen PE units are connected together to form one 16-bit arithmetic logic unit, and the final carry-out of such a 16-bit arithmetic logic unit is saved into a sign indicator register (17) of the neuron and functions as a carry-in or a conditional operation indicator for the subsequent operations.

9. The dynamically reconfigurable multi-level parallel single instruction multiple data array processing system according to claim 8, wherein the respective bit operands of the 16-bit arithmetic logic unit are simultaneously from the memories of all the PE units, so the neuron (15) corresponds to a local memory (20) with a bit width of 16-bits and a bit depth of W.

10. The dynamically reconfigurable multi-level parallel single instruction multiple data array processing system according to claim 9, wherein the neuron (15) obtained by reconstructing the 4×4 PE sub-array (4) is capable of communicating data with the its left and right neighboring neurons in a communication bandwidth of 1-bit; and the SOM neuron (15) comprises one 16-bits ALU (18), one shift control unit (19), a second local memory (20) with a bit width of 16-bits and a bit depth of W, 16-bit temporal register as well as some additional flag registers.

11. The dynamically reconfigurable multi-level parallel single instruction multiple data array processing system according to claim 1, wherein the particular circuit arrangement of the PE unit comprises one 1-bit ALU unit (23), a first operand selector (26), a second operand selector (25), a local dual-port memory (28) with a bit width of 1-bit and a bit depth of W, one condition selector (29), one carry register (22), one temporary register (24) and some multiplexers relevant to operand selection and dynamical reconfiguration, and the two inputs of these multiplexers relevant to reconfiguration are marked as PE and SOM which represent to implement a data selection function relevant to reconfiguration.

12. The dynamically reconfigurable multi-level parallel single instruction multiple data array processing system according to claim 11, wherein in order to reconfigure into a self organizing map neural network, the PE units in each 4×4 PE sub-array (4) further share one additional flag register file (31), and such a flag register file (31) is constituted of four 1-bit flag registers which are reconfiguration flag register Rflag (32), winning flag register Wflag (33), sign flag register Sflag (34) and overflow flag register OVflag (35); the flags of the flag register file (31) are output to the PE unit for some data selection control and their values are updated by outputs of some PE units and/or external control signals from the array instructions.

13. The dynamically reconfigurable multi-level parallel single instruction multiple data array processing system according to claim 12, wherein the reconfiguration flag register Rflag (32) implements the dynamical reconfiguration by controlling the reconfiguration multiplexer to change topological connections among the PE units; when the Rflag is set to 0, the respective reconfiguration multiplexers select input data at the "PE" terminal, and at this moment, the whole array is operated in a pixel-level parallel processor mode; and when the Rflag is set to 1, the reconfiguration multiplexers select input data at the "SOM" terminal, and at this moment the whole array is operated in a SOM neural network mode.

14. The dynamically reconfigurable multi-level parallel single instruction multiple data array processing system according to claim 12, wherein the winning flag register Wflag (33), the sign flag register Sflag (34) and the overflow flag register OVflag (35) are only operated in the SOM neural network mode.

15. The dynamically reconfigurable multi-level parallel single instruction multiple data array processing system according to claim 12, wherein the control signals for the PE units and the flag register file (31) are from decoded output of the combination of the instruction memory and some specific registers in the array controller.

16. The dynamically reconfigurable multi-level parallel single instruction multiple data array processing system according to claim 12, wherein the data input and output of the PE unit are different for their different bit-slice position k in the SOM neuron where the PE unit is located, and the details are shown as follows:

in a multiplexer relevant to reconfiguration and connected to the first operand selector, for k=15, an arithmetic higher bit should be connected to the own output of the PE unit and a logic higher bit should be connected to the least significant bit (LSB) output of the SOM neuron west to the neuron where the concerned PE is located; and for other values of k, the arithmetic higher bit and the logic higher bit are both connected to the output of the adjacent higher bit slice PE of the SOM neuron where the concerned PE is located;

in a multiplexer relevant to reconfiguration and connected to the first operand selector, for k=0, a logic lower bit should be connected to the output of the most significant bit (MSB) of the SOM neuron east to the SOM neuron where the concerned PE is located; for other values of k, the logic lower bits are both connected to output of the adjacent low bit slice PE of the neuron where the concerned PE is located;

in a multiplexer (27) relevant to reconfiguration and connected to the second operand selector, for k<12, the input data at its SOM terminal is OVflag; otherwise, the input data is zero;

for k=12, the result of its ALU is used to update the value of OVflag and for other values of k, the results of the ALUs can't be used to update the OVflag value;

for k=15, the carry-out of the ALU is used to update the value of Sflag and for other values of k, the carry-outs of the ALUs function as the carry-in of the ALUs of their corresponding adjacent higher bit slide PEs of the SOM neuron where the PE unit is located in the SOM mode; and for k=0, the carry-in of the ALU in the SOM mode is Sflag; and for other values of k, the carry-ins are the carry-out of their corresponding adjacent lower bit slide PE of the SOM neuron where the concerned PE unit is located.

17. The dynamically reconfigurable multi-level parallel single instruction multiple data array processing system according to claim 12, wherein the whole dynamically reconfigurable parallel image processing element array and self organizing map (SOM) neural network (2) is enabled to operate in a pixel-level parallel processing mode or a self-organizing map (SOM) neural network mode according to different values of the reconfiguration flag register Rflag (32).

18. The dynamically reconfigurable multi-level parallel single instruction multiple data array processing system according to claim 17, wherein when the r dynamically reconfigurable parallel image processing element array and self organizing map (SOM) neural network (2) is operated in a pixel-level parallel processor mode, each of the PE units receives identical control instruction and processes different data in their local 1-bit width memory (40); the PE unit implements a basic 1-bit addition operation, complementary operation, "AND" or "OR" logic operations based on a memory access manner of "read-modify-write" during a single clock cycle; a fixed-point multiple bits arithmetic or logic operation for the low-level and middle-level image processing is realized in a 1-bit ALU 37 in the pixel-level parallel processor PE unit by being decomposed into basic 1-bit serial operations as mentioned above; the carry-out generated during operation is stored into a Creg register (38); if the two operands required by the operation are both from the local memory, one of them should be copied to a temporary register Treg (39) before each of the bit data are operated, so that the temporally stored data functions as a second operand of the ALU to operate; the PE unit communicates data with its adjacent four PE units at east, south, west and north in a bandwidth of 1 bit; a data of any number of bits can be communicated between any two of the PE units in the array by a combination of data communications between the adjacent processing elements; and in the pixel-level parallel processor mode, all of the PE units have the same function which is irrespective of their bit slice position k, and the flag register file (31) is out of function.

19. The dynamically reconfigurable multi-parallel single instruction multiple data array processing system according to claim 17, wherein when the dynamically reconfigurable parallel image processing element array and self organizing map (SOM) neural network (2) is operating in a SOM neural network mode, a reference vector and an external input vector stored internal to every SOM neuron comprise an integer portion of 8 bits and a fractional part of 4 bits, which are unsigned fixed-point numbers; in order for the intermediate result during operation not to be overflow, the supported maximum dimensions of the vector should be limited according to the effective bits of the vector components; the input vectors are provided externally from the system in the order of its components and each of the components are simultaneously broadcasted to all of the SOM neurons.

20. The dynamically reconfigurable multi-level parallel single instruction multiple data array processing system according to claim 19, wherein on the assumption that each of the SOM neurons has obtained a reference vector in some manner and stores it in the memory (41) with a bit width of 16, during winning judging stages for SOM neurons common to the train and recognition process in the SOM neural network, each of the SOM neurons first simultaneously calculates a block distance between the input vector and its own reference vector, the block distance is the addition of absolute differences (SAD) between each of the corresponding components of the two vectors; the calculation of the absolute difference is implemented by utilizing bit inverse and bit addition of the ALU in conjunction with the sign flag register Sflag; absolute difference for each of the components is calculated and accumulated to obtain a final distance which is a unsigned fixed-point number of 16 bits; then the distances calculated for each of the SOM neurons are input to the RP array in parallel to compare their values, and coordinates of the winning SOM neuron which has the minimum distance value are exacted for final determination of classes for the image feature recognition or for adjustment of the reference vector during the SOM neural network training stage;

for a stage of adjustment of the reference vectors which only exists during training, the external processor of the system set the winning flag register Wflag to be 1 for all of the SOM neurons with a distance to the winning SOM neuron smaller than a certain value to be 1, while set the Wflag(?) to be 0 for all other neurons, thus only the neurons within the winning regions may update their reference vectors; when the reference vector is updated, the components of the reference vector are adjusted with respect to the direction which is the same as or opposite to that of the input vector according to whether the result of classifying is right, and the amplitude of the adjustment is proportional to the difference between the corresponding component in the input vector and the reference vector; the multiplication by the coefficient of proportionality is can be realized by proper combination of addition, subtraction and bit-shifting operations in the SOM neural network mode; the bit-shifting operation is implemented via the data communications of adjacent PE units in the SOM neural network mode; the addition operation and subtraction operations related to the adjustment of the reference vector are implemented by bit inverse and bit addition of the ALU (42) in conjunction with the sign flag register Sflag; if the adjusted reference vector component does not range between 0 and the limited defined by the effective number bits of the vector components as mentioned above, a cut-off renormalization is need, which compulsively set all the negative number s to be 0 and set all of the numbers higher than or to be the limit, so as to guarantee the SAD addition result for the next stage of winning determination would not be larger than 16 bits; the cut-off renormalization should be assisted by the Sflag and OVflag flag registers.

21. The dynamically reconfigurable multi-level parallel single instruction multiple data array processing system according to claim 1, wherein the row processor RP array (5) is used to implement grey-scale morphologic operations, image feature extraction and the extraction of coordinates of the winning SOM neuron, for the assistance of the reconfigured SOM neural network; the RP array (5) comprises a 8-bit ALU (46), a 8-bit shift register (43), two operand selectors (44-45), a condition generator (47) based on a dual-input "AND" gate and a general register file (48) with a depth of V and a bit width of 8-bits.

22. The dynamically reconfigurable multi-level parallel single instruction multiple data array processing system according to claim 21, wherein for the row processor RP array (5), each of the row processor RP units is used to implement arithmetic operations of 8-bits including addition, subtraction, calculating of absolute value, arithmetic/logic shift and data comparison, so that a data larger than 8-bits is decomposed into a number of operations less than or equal to 8-bits and operated in byte-serial manner; the RP unit supports conditional operations and the condition flag is from a previous calculating result flag of the ALU (46) and functions as a write enable signal for the register file (48).

23. The dynamically reconfigurable multi-level parallel single instruction multiple data array processing system according to claim 21, wherein in the RP array (5), each of the RP units communicates data with the nearest RP units at its upper and lower sides, and some RP units even communicate data with the two other RP units which is spaced from S rows at its upper and lower sides and those RP units constitute a RP skip chain for rapidly accomplishing global image processing operations.

24. The dynamically reconfigurable multi-level parallel single instruction multiple data array processing system according to claim 21, wherein the 8-bit shift register (43) in each of the RP are serially connected to implement a cross shift which includes a word parallel shift along a vertical direction and a bit serial shift along a horizontal direction, so that the reconfigurable PE array and the SOM neural network, the RP array, and the modules outside the array processors can communicate with each other to input and output data.

* * * * *